United States Patent [19]

Self

[11] Patent Number: 5,630,389

[45] Date of Patent: May 20, 1997

[54] CYLINDER HEAD BOLT PLUG

[76] Inventor: Kevin G. Self, Rte. 1, Box 28A, Caddo, Okla. 74729

[21] Appl. No.: 537,267

[22] Filed: Sep. 29, 1995

[51] Int. Cl.$^6$ ........................................... F02F 1/24
[52] U.S. Cl. ................................................ 123/193.3
[58] Field of Search .......................... 123/193.3, 193.5, 123/193.1, 195 C

[56] References Cited

U.S. PATENT DOCUMENTS

| | | | |
|---|---|---|---|
| 3,653,369 | 4/1972 | Fangman et al. | 123/193.3 |
| 4,291,650 | 9/1981 | Formia et al. | 123/193.5 |
| 4,524,732 | 6/1985 | Dworak et al. | 123/193.3 |
| 4,530,323 | 7/1985 | Wakasa | 123/193.5 |
| 5,069,176 | 12/1991 | Ruf et al. | 123/193.5 |

*Primary Examiner*—Marguerite McMahon
*Attorney, Agent, or Firm*—John W. Wustenberg; James T. Robinson

[57] ABSTRACT

A cylinder head bolt plug replaces longer cylinder head bolts and provides increased air flow to the combustion chamber of an internal combustion engine, reduced exhaust back pressure, and reduced frequency of cracked cylinder heads. Longer cylinder head bolts are replaced by a cylinder head bolt plug and shorter inner-fitting cylinder head bolts to permit reshaping and recontouring of the interior walls of air inlets and exhaust gas outlets. The shorter inner-fitting cylinder head bolts also reduce flexing and cracking of cylinder heads caused by tightening of standard longer cylinder head bolts. Method and apparatus permit modification of existing cylinder heads according to the invention.

30 Claims, 8 Drawing Sheets

CYLINDER HEAD BOLT PLUG

BACKGROUND OF THE INVENTION

1. Field of the Invention

This invention relates to internal combustion engines and the like and, more particularly, but not by way of limitation, to a cylinder head bolt plug for cylinder heads which permits increased air charge to the combustion chamber, decreased exhaust back pressure, and a lower frequency of cracked cylinder heads.

2. Discussion

It is known in the art relating to internal combustion engines to provide one or more combustion chambers having inlet ports with openings for intermittently admitting fuel and air to the combustion chambers. It has been previously recognized that an air intake system designed for free breathing and maximum air flow increases high speed performance and combustion efficiency. A known method for increasing air flow through the air intake system is to modify the configuration of the air inlets by reshaping or recontouring the interior walls of the air inlets to reduce pressure drop and increase air velocity through the air inlets. Modification of the air inlets is normally accomplished by removing metal from the interior walls of the air inlets.

Although the reason for the improvement produced by modification of the air inlets is not fully understood, it is believed that the reshaping and recontouring of the interior walls of the air inlets reduce the thickness of the boundary layer along the interior walls. With a thinner boundary layer, the flow of air through the air inlets to the combustion chamber would be closer to the interior walls and act to follow the interior walls in laminar flow, thus enhancing flow of air through the air inlets and into the combustion chamber.

Traditional cylinder head designs require bores or through holes through which cylinder head bolts pass to secure the cylinder head to the engine block. Many of the bores or through holes are relatively shorter and typically require cylinder head bolts of from one and one-half inches to one and three-fourths inches in length. Other bores or through holes pass through thicker portions of the cylinder head and require cylinder head bolts of from three inches to three and three-fourths inches in length. The relatively longer bores or through holes limit the extent to which metal can be removed from the interior walls of the air inlets to reshape and recountour the interior walls of the air inlets and increase air flow. Moreover, the maximum increase in air flow frequently results from reshaping and recontouring the interior walls nearest the bores or through holes.

It is further known in the art relating to internal combustion engines that a reduction in exhaust back pressure improves performance of the engine. Just as an air intake system designed for free breathing and maximum air flow increases high speed performance and combustion efficiency, an exhaust outlet system designed for maximum flow of exhaust gases also increases high speed performance and combustion efficiency. A known method for increasing flow of exhaust gases through the exhaust outlet system is to modify the configuration of the exhaust gas outlets by reshaping or recontouring the interior walls of the exhaust gas outlets to reduce exhaust back pressure and increase flow of exhaust gases through the exhaust gas outlets. Modification is normally accomplished by removing metal from the interior walls of the exhaust gas outlets.

As in the case of the air inlets, the relatively longer cylinder head bolt bores or through holes limit the extent to which metal can be removed from the interior walls of the exhaust gas outlets to reshape and recountour the interior walls of the exhaust gas outlets and reduce exhaust back pressure.

It is also well known in the art relating to internal combustion engines that cracking of the cylinder heads is caused, at least in part, by flexing of the cylinder heads as a result of tightening of the relatively longer cylinder head bolts.

The cylinder head bolt plug removes the limitations on reshaping and recontouring both air inlets and exhaust gas outlets imposed by the relatively longer bores or through holes through which cylinder head bolts pass to secure the cylinder head to the block. The cylinder head bolt plug also reduces flexing and cracking of cylinder heads by replacing longer cylinder head bolts with shorter inner-fitting cylinder head bolts.

SUMMARY OF THE INVENTION

The present invention provides a method and apparatus for achieving increased air flow to the combustion chamber of an internal combustion engine.

An object of the present invention is to provide a cylinder head bolt plug to permit removal of additional metal from interior walls of the air inlets of an internal combustion engine in a location where removal of metal is normally restricted by the presence of cylinder head bolt bores or through holes.

Another object of the present invention is to provide a cylinder head design which permits replacement of longer cylinder head bolts by shorter inner-fitting head bolts so the cylinder head is secured to the engine block from a position uniformly nearer the engine block, thereby reducing the flexing of the cylinder head and the frequency of cracking of cylinder heads.

Yet another object of the present invention is to provide a cylinder head design which permits replacement of longer cylinder head bolts by shorter inner-fitting cylinder head bolts so the cylinder head is secured to the engine block from a position uniformly nearer the engine block, thereby providing more even pressure on the head gasket and reducing the frequency of leaking head gaskets.

Yet another object of the present invention is to provide a cylinder head bolt plug to permit removal of additional metal from interior walls of exhaust gas outlets of an internal combustion engine in a location where removal of metal is normally restricted by the presence of cylinder head bolt bores or through holes.

Yet another object of the present invention is to provide a cylinder head bolt plug which can be installed in an existing cylinder head.

Yet another object of the present invention is to provide a cylinder head bolt plug kit for installation in an existing cylinder head in which the kit includes a short inner-fitting cylinder head bolt to replace the standard longer cylinder head bolt.

Other objects, features, and advantages of the present invention will become clear from the following description of the preferred embodiment when read in conjunction with the accompanying drawings and appended claims.

DETAILED DESCRIPTION OF THE INVENTION

In the following description of the invention, like numerals and characters designate like elements throughout the figures of the drawings.

Figure 1:
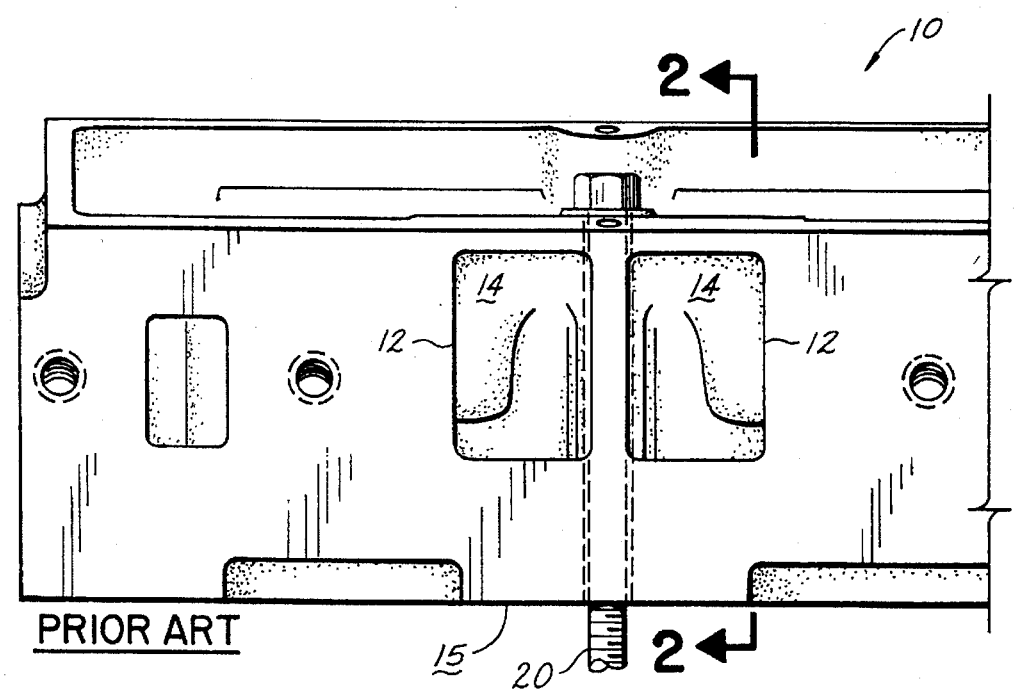
FIG. 1 (prior art) is a partial view of twin air inlets of a typical V-8 internal combustion engine cylinder head.

Referring generally to the drawings and more particularly to FIG. 1, a typical prior art cylinder head 10 having air inlets 12, interior walls 14 and a sealing surface 15 (which mates with the engine block, not shown) is depicted therein.

The air inlets 12, as depicted in FIG. 1, are typical of twin air inlets in a cylinder head for a V-8 internal combustion engine such as a small block Chevrolet. FIG. 1 should be regarded as diagrammatic because other parts of the cylinder head 10 have not been fully reproduced. A V-8 engine has two cylinder heads and each cylinder head has four air inlets, but a single pair of air inlets is depicted to simplify illustration of the present invention.

Figure 2:
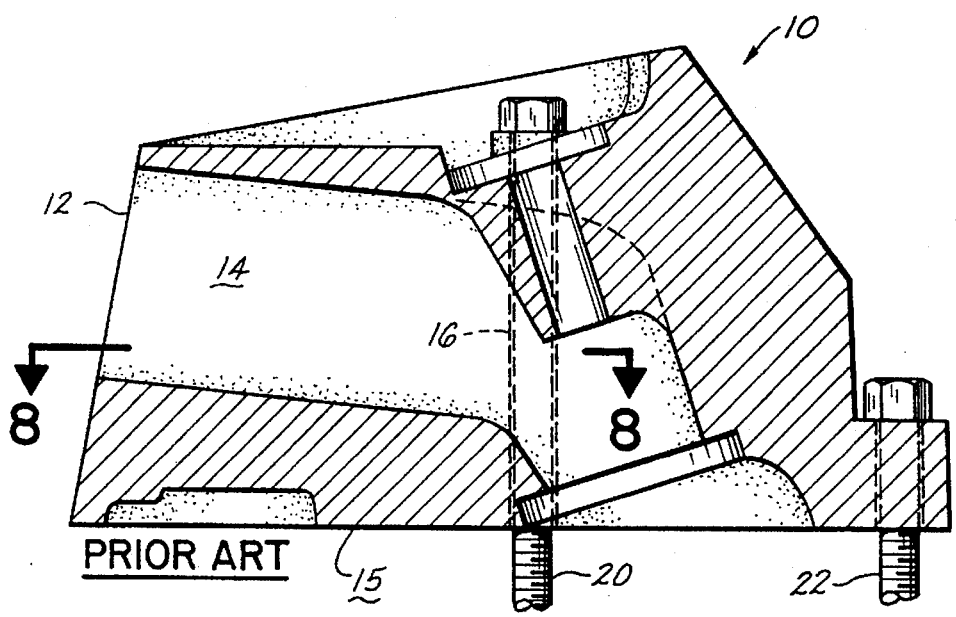
FIG. 2 (prior art) is a cross-sectional view along 2—2 of the cylinder head of FIG. 1.

Referring now to FIG. 2, depicted therein is a cross-sectional view along 2—2 of the prior art cylinder head 10 of FIG. 1. The cylinder head 10 has longer bores or through holes 16 (only one shown) and shorter bores or through holes 18. Longer cylinder head bolts 20 (only one shown) and shorter cylinder head bolts 22 (only one shown) secure the cylinder head 10 to the engine block (not shown). The shorter cylinder head bolts 22 are typically 1.5 to 2.0 inches long, while the longer cylinder head bolts 20 typically range in length from about three to about four inches.

While reshaping and recontouring of the interior air inlet walls 14 is well known in the art, the presence of the longer cylinder head bolts 20 in the longer bores 16 limits the extent to which metal can be removed, especially from the interior air inlet wall 14 between adjacent air inlets.

Figure 3:
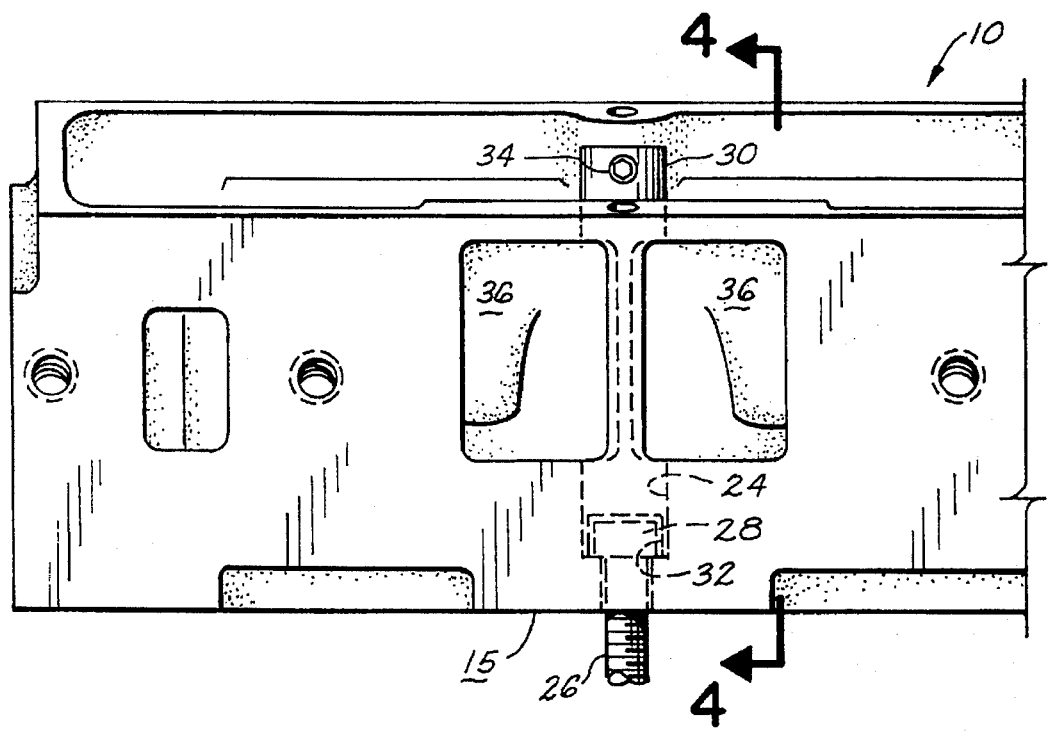
FIG. 3 is a partial view of the cylinder head of FIG. 1 modified according to the present invention.
Figure 4:
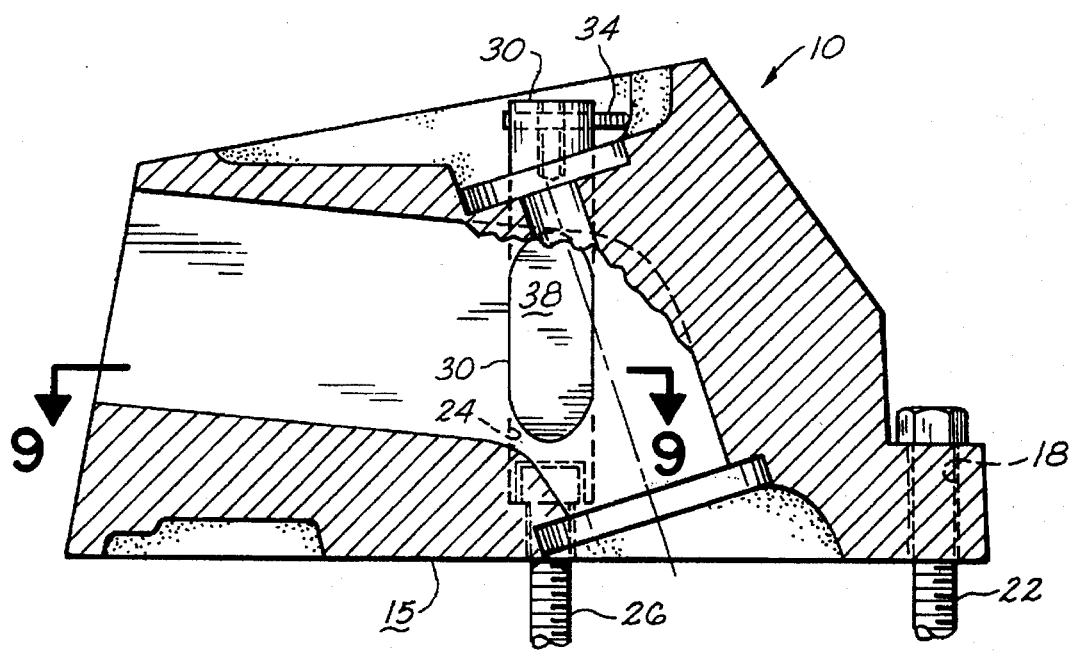
FIG. 4 is a is a cross-sectional view 4—4 of the cylinder head of FIG. 3.

FIG. 3 shows the cylinder head 10 modified according to the present invention. FIG. 4 is a cross-section along 4—4 of FIG. 3. The longer bore or through hole 16 (see FIG. 2) is shown after drilling to create a larger bore 24. An inner-fitting head bolt 26 having a head 28 secures the cylinder head 10 to the engine block (not shown).

Still referring to FIG. 3 and FIG. 4, a cylinder head bolt plug 30 having a recess 32 is deployed within the larger bore 24. The recess 32 of the cylinder head bolt plug 30 encloses the head 28 of the short inner-fitting head bolt 26. A set screw 34 in the cylinder head bolt plug 28 engages a boss (not shown) on the cylinder head 10 to prevent the cylinder head bolt plug 30 from moving in the larger bore 24. Reshaped and recontoured interior air inlet walls 36 of the air inlets 12 indicate simultaneous removal of metal from the interior air inlet walls 36 and from the cylinder head bolt plug 30.

The cylinder head bolt plug 30 permits recontouring and reshaping of the interior air inlet walls 38 of the air inlets 12 well beyond the limitations imposed by the longer cylinder head bolts 20 and the longer bores 18 (see FIGS. 1 and 2).

Referring now to FIG. 4, the set screw 34 is shown securing the cylinder head bolt plug 30 to a boss on the cylinder head 10. A surface 38 on the cylinder head bolt plug 30 indicates removal of metal during recontouring and reshaping of the interior air inlet walls 14 as described hereinabove.

FIG. 3 illustrates the extent to which additional metal may be removed from the interior air inlet walls 14 of the air inlets 12 by use of the cylinder head bolt plug 30. The dashed lines of the cylinder head bolt plug 30 indicate that the recontoured and reshaped interior air inlet walls 36 of the air inlets 12 are tapered so the interior air inlet wall 36 between adjacent air inlets 12 is substantially thinner within the cylinder head 10 than at the air inlets 12. It will be understood by one skilled in the art that the positioning of the set screw 34 in the cylinder head bolt plug 30 is not critical to the present invention. As shown in FIGS. 3 and 4, the set screw 34 is roughly horizontal to the longitudinal axis of the cylinder head bolt plug 30. If convenient for a different cylinder head configuration, the set screw 34 can be threaded through the cylinder bolt plug 30 at a generally downward angle to permit removal of the set screw 34 from above.

Figures 5A, 5B, 5C, 5D, 5E:
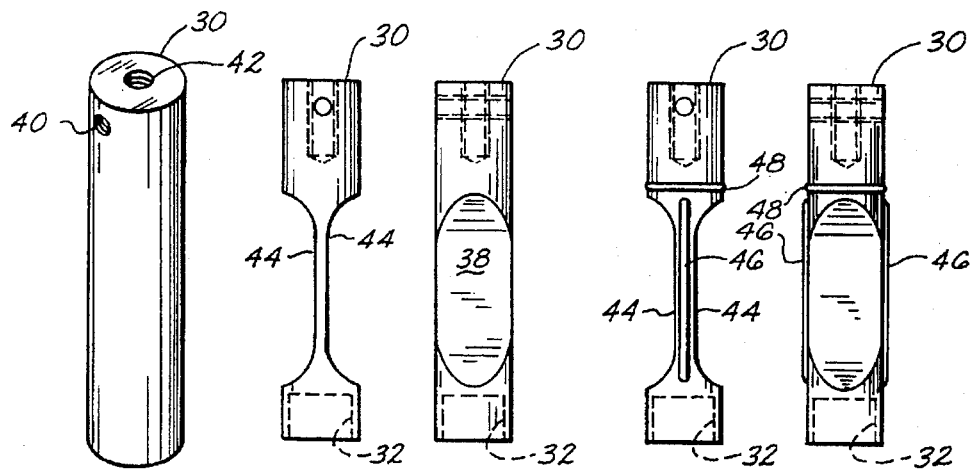
FIGS. 5A through 5E are views of the cylinder head bolt plug.

Referring now to FIGS. 5A–5E, shown therein is the cylinder head bolt plug 30. FIG. 5A depicts a cylinder head bolt plug 30 prior to machining. A threaded opening 40 receives the set screw 34 (not shown). An additional threaded opening 42 is provided to facilitate removal of the cylinder head bolt plug 30 from the cylinder head 10.

In FIGS. 5B and 5D, cutouts 44 depict an altered shape in the cylinder head bolt plug 30 caused by removal of metal from the cylinder head bolt plug 30 during reshaping and recontouring of the interior air inlet walls 14 while the cylinder head bolt plug 30 is secured within the larger bore 24 of the cylinder head 10. FIG. 5C depicts the surface of the cylinder head bolt plug 30 following reshaping and contouring.

Still referring to FIGS. 5B and 5D, two cutouts 44 are depicted on the cylinder head bolt 30. The two cutouts 44 are appropriate when the longer cylinder head bolt 20 (see FIGS. 1 and 2) is positioned between twin air inlets. If the cylinder head configuration does not include twin air inlets, only one cutout 44 would be present in the cylinder head bolt plug 30.

In FIGS. 5D and 5E, vertical compression seals 46 are shown in a vertical compression seal groove (not shown). The vertical compression seals 46 prevent communication between adjacent air inlets 12 of the cylinder head 10 following reshaping and recontouring of the interior air inlet walls 14 (see FIG. 1) to produce recontoured and reshaped interior air inlet walls 36 (see FIG. 3). The vertical compression seals 46 are not necessary if the cylinder head configuration does not include twin air inlets. A circular compression seal 48 resting in a circular compression seal groove (not shown) seals the cylinder head plug 30 against the larger bore 24 (see FIGS. 3 and 4) at a suitable position between the vertical compression seals 44 and the threaded hole 40.

During operation of an internal combustion engine, a vacuum (typically, 5 to 20 inches of water) exists within the air passages of the cylinder head 10. The vertical compression seals 46 and the circular compression seal 48 are constructed of a material capable of withstanding temperatures found in the cylinder head, typically 140 to 220 degrees Fahrenheit. While the presently preferred embodiment of the invention utilizes O-rings, a person skilled in the art will understand that any suitable compression sealing means, including but not limited to silicone adhesive, is within the spirit of the invention.

Figures 6A, 6B, 6C:
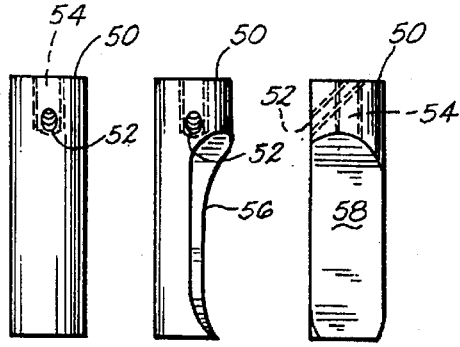
FIGS. 6A through 6C are views of another embodiment of the cylinder head bolt plug.

Referring now to FIGS. 6A–6C, another embodiment of the present invention is depicted. In FIG. 6A, a cylinder head bolt plug 50, a threaded set screw opening 52, and a threaded opening 54 (to facilitate removal of the cylinder head bolt plug 50 from a cylinder head) are shown prior to machining. In FIGS. 6B and 6C, a cutout 56 indicates removal of metal during recontouring and reshaping of interior air inlet walls 14 to produce a new surface 58 on the cylinder head bolt plug 50.

Still referring to FIGS. 6A–6C, the cylinder head bolt plug 50 does not provide a recess for an inner-fitting head bolt like the recess 32 shown in FIGS. 3–4. Cylinder heads which have sufficient metal thickness in the region near the sealing surface 15, i.e., cylinder heads which have sufficient short side thickness, permit use of a cylinder head bolt plug which does not include a recess for the inner-fitting head bolt.

Still referring to FIGS. 6A–6C, the cylinder head bolt plug 50 depicted therein does not provide vertical compression seals like the vertical compression seals provided in the cylinder head bolt plug 30. Vertical compression seals are not required if the cylinder head bolt is adjacent to a single air inlet.

Still referring to FIGS. 6A–6C, a circular compression seal (not shown) similar to the circular compression seal 48 of the cylinder head bolt 30 (see FIGS. 5D and 5E) is required to prevent oil from leaking into the air inlet.

Figure 7:
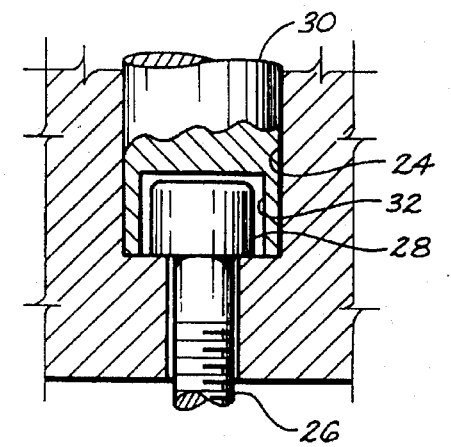
FIG. 7 is a detailed cross-section of a portion of the cylinder head bolt plug.

Referring now to FIG. 7, depicted therein is a portion of the larger bore 24 and the cylinder head bolt plug 30 in which the recess 32, the inner-fitting head bolt 26, and the head 28 of the inner-fitting head bolt 26 are shown in greater detail.

Figure 8:
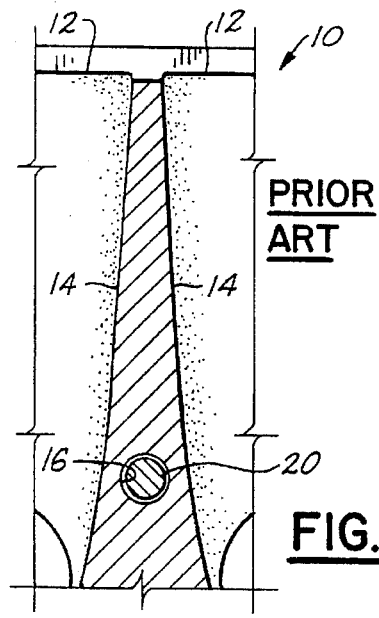
FIG. 8 (prior art) is a partial cross-sectional view along 8—8 of the cross-sectional view in FIG. 2.

Referring now to FIG. 8, a partial cross-sectional view along 8—8 of the cross-sectional view in FIG. 2 (prior art cylinder head 10), the interior air inlet walls 14 between air inlets 12 of the cylinder head 10 are depicted. The longer cylinder head bolt 20 is shown within the longer bore 16.

Figure 9:
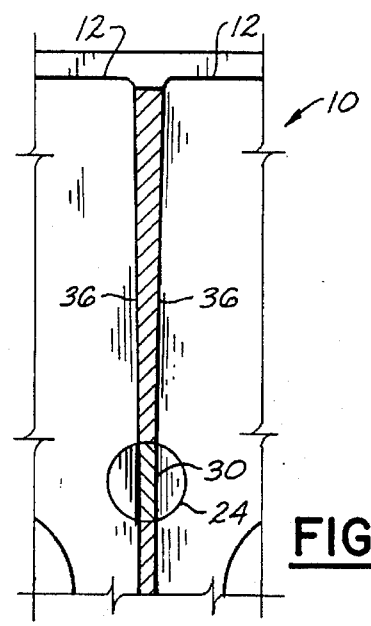
FIG. 9 is a partial cross-sectional view along 9—9 of the cross-sectional view in FIG. 4.

Referring now to FIG. 9, a partial cross-sectional view along 9—9 of the cross-sectional view in FIG. 4, the cylinder head bolt plug 30 is deployed within the larger bore of the cylinder head 10 modified according to the present invention. The reshaped and recontoured interior air inlet walls 36 indicate removal of metal to increase combustion air flow from the air inlets 12 to the combustion cylinder (not shown).

Referring now to FIG. 8 (prior art) and FIG. 9, the advantage of the cylinder head bolt plug 30 in permitting increased metal removal along the interior air inlet walls 14 to produce recontoured and reshaped interior air inlet walls 36 is obvious. Removal of metal from the interior air inlet walls 14 of the prior art cylinder head 10 is limited by the location of the longer bore 16 and the longer cylinder head bolt 20. When the cylinder head 10 is modified according to the present invention, additional metal removal from the interior air inlet walls 14 is possible.

Figure 10:
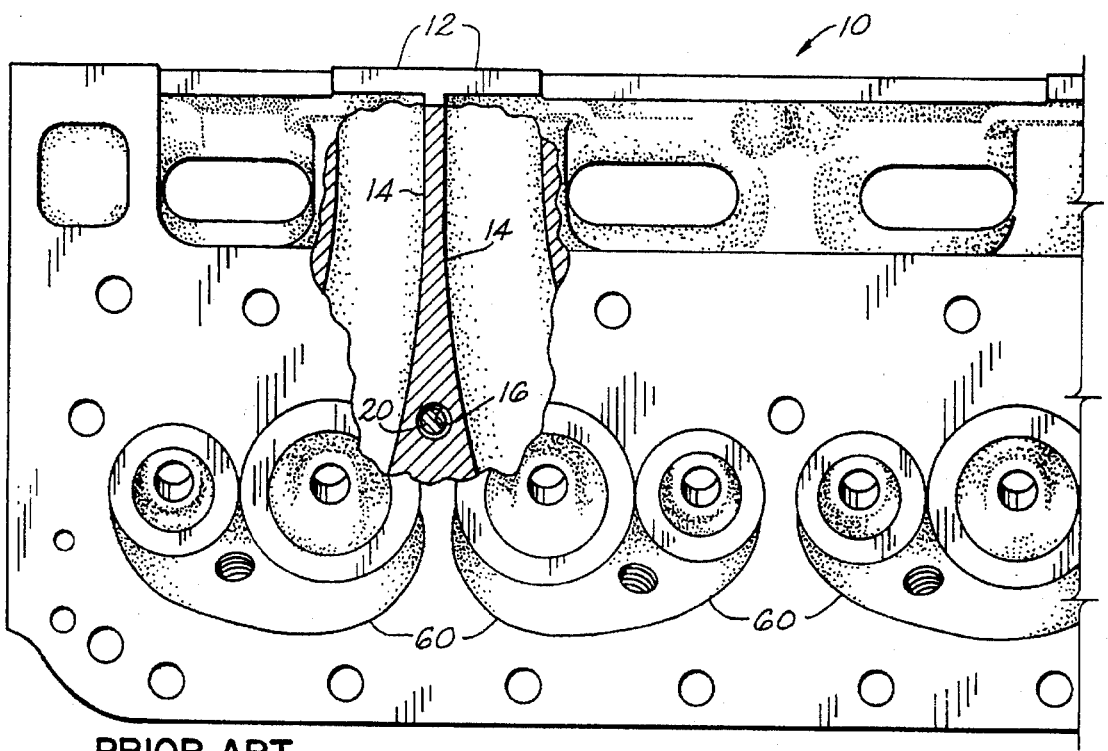
FIG. 10 (prior art) is a another partial view of the V-8 internal combustion engine cylinder head depicted in FIG. 1, including a partial cutaway revealing air inlets.

Referring now to FIG. 10 (prior art), depicted therein is the cylinder head 10 viewed on the side of the cylinder head 10 which mates with the engine block (not shown). The air inlets 12, the interior air inlet walls 14, the longer bore 16, and the longer cylinder head bolt 20 are shown in relation to valve bowls 60.

Figure 11:
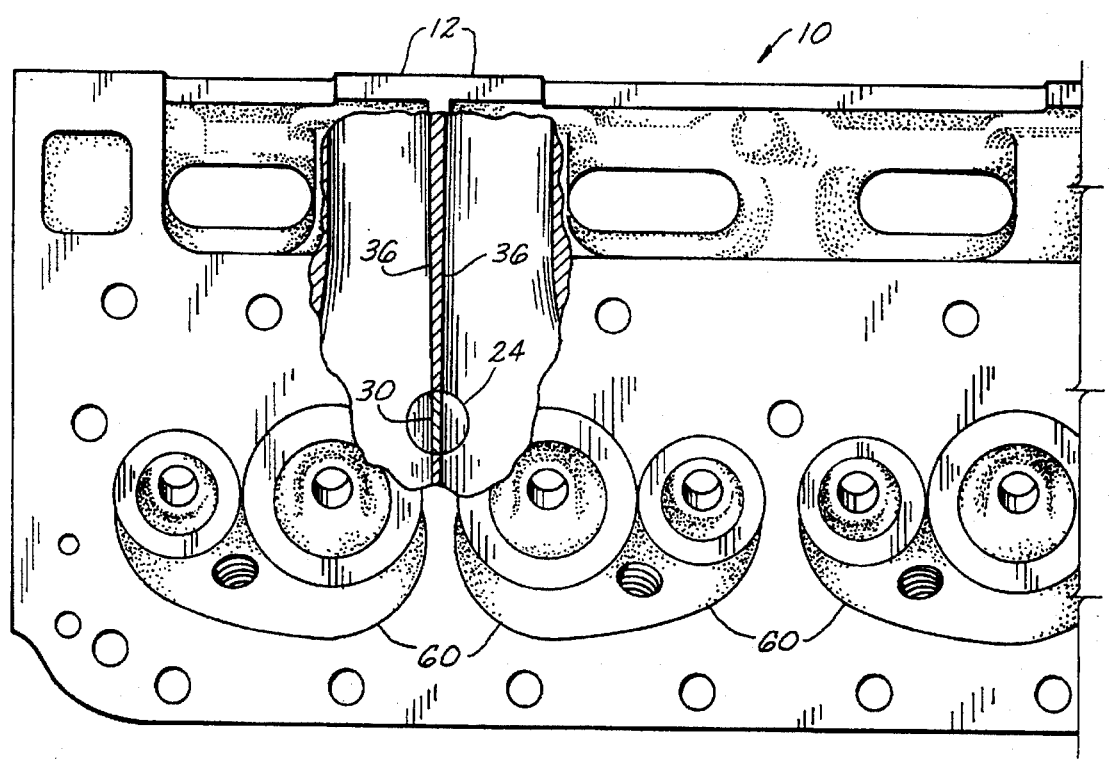
FIG. 11 is another partial view of the cylinder head of FIG. 3, modified according to the present invention, including a partial cutaway revealing the air inlets.

Referring now to FIG. 11, depicted therein is the cylinder head 10 modified in accordance with the cylinder head bolt plug 30. The interior air inlet walls 14 according to the prior art (see FIG. 10) have been modified to produce recontoured and reshaped interior air inlet walls 36.

Figure 12:
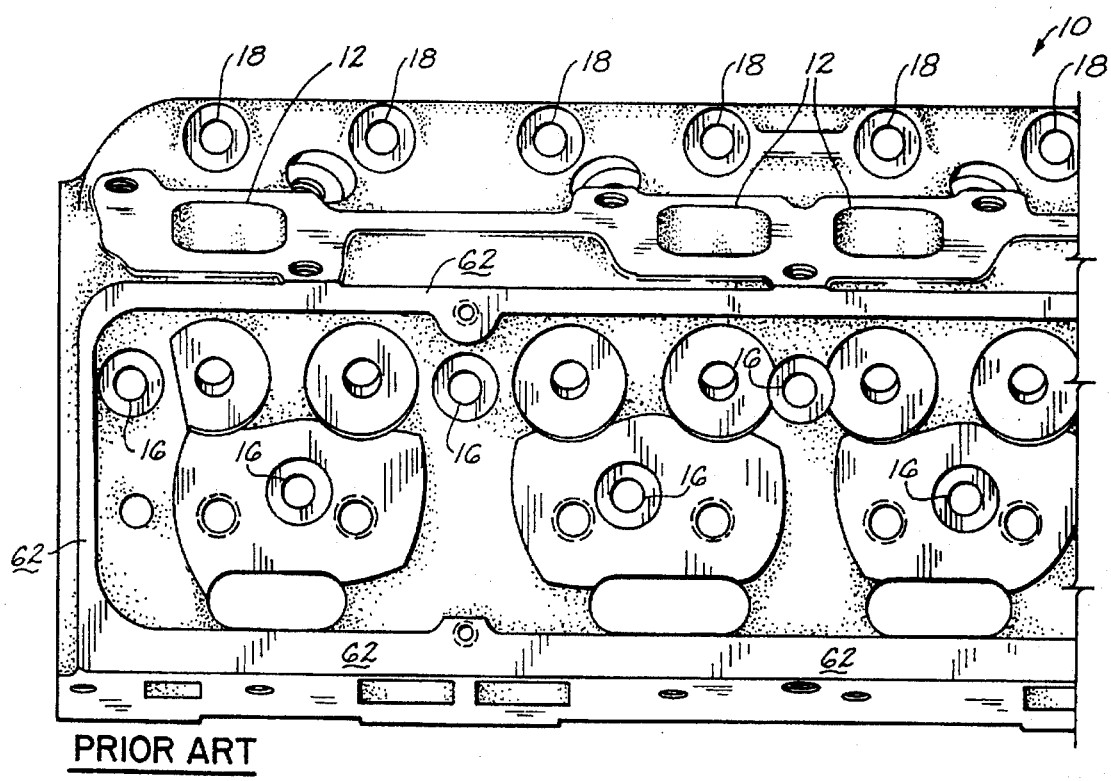
FIG. 12 (prior art) is a another partial view of the cylinder head depicted in FIG. 1.

Referring now to FIG. 12 (prior art), depicted therein is the cylinder head 10 viewed on the side of the cylinder head 10 which includes a valve cover sealing surface 62. The air inlets 12, the longer bores 16, and the shorter bores 18 are illustrated.

Figure 13:
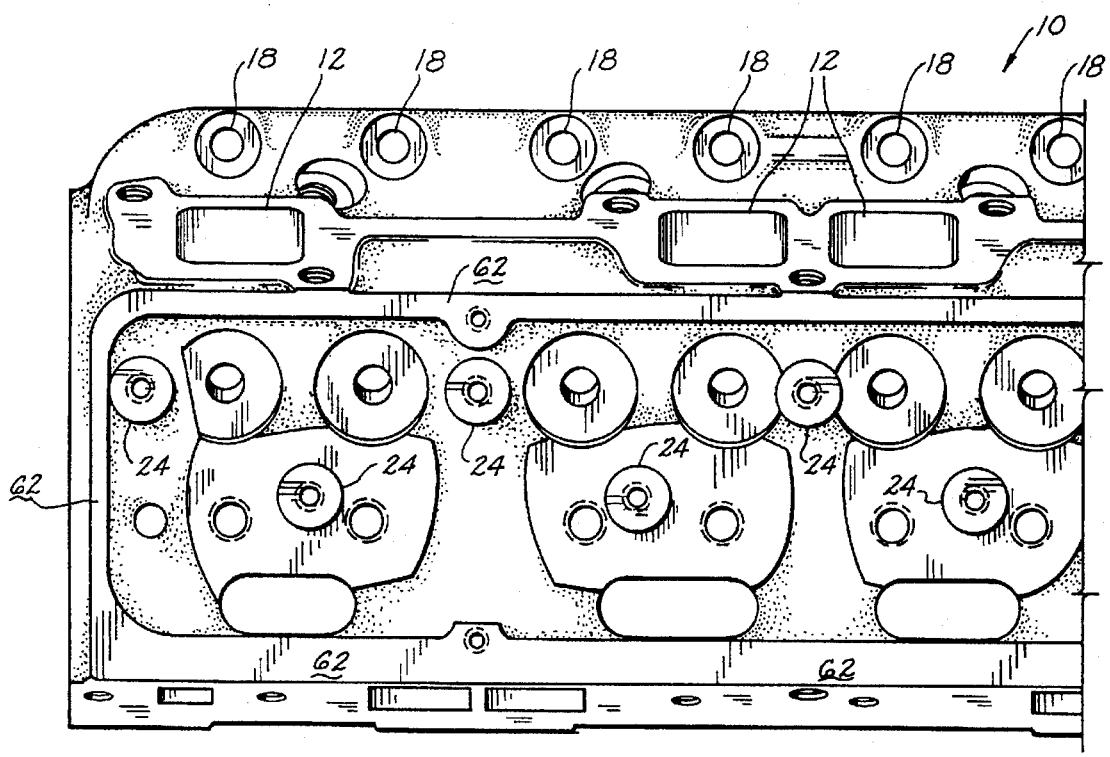
FIG. 13 is a another partial view of the cylinder head of FIG. 3.

Referring now to FIG. 13, depicted therein is the cylinder head 10 modified in accordance with the present invention. The longer bores 16 depicted in FIG. 12 have been drilled to create larger bores 24 in which the cylinder head bolt plugs 30 will be deployed.

Figure 14:
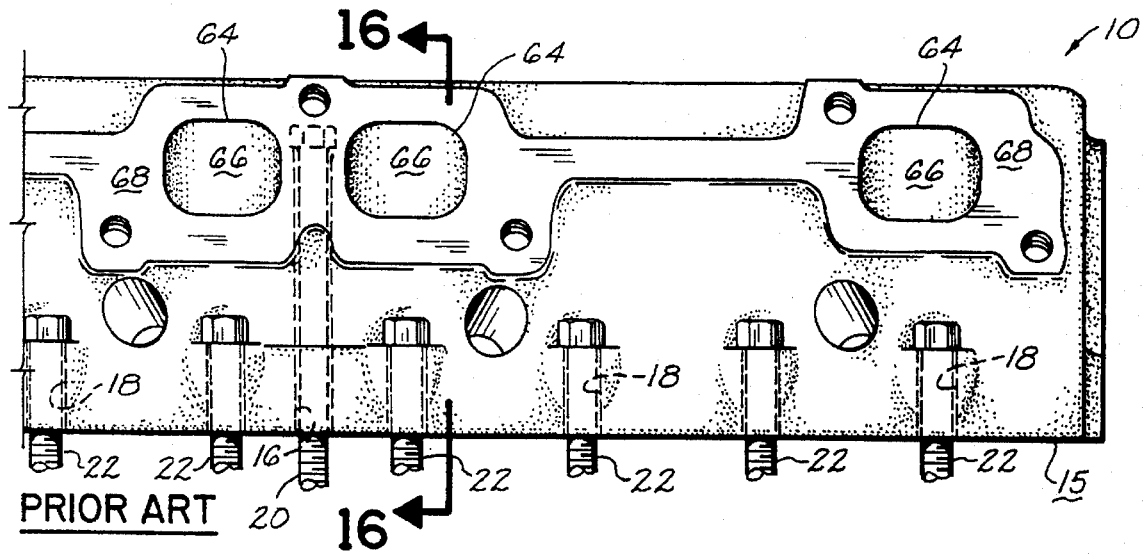
FIG. 14 (prior art) is a partial view of the exhaust manifold side of the cylinder head depicted in FIG. 1.

Referring now to FIG. 14, depicted therein is an exhaust-manifold side of the cylinder head 10 of the prior art. Exhaust gas from the combustion process is discharged through exhaust gas outlets 64. Interior exhaust outlet walls 66 form a passageway through which exhaust gases pass from the cylinder (not shown) to the exhaust gas outlets 64. Also depicted in FIG. 14 are the shorter bores 18, the shorter cylinder head bolts 22, and an exhaust manifold sealing surface 68. The longer cylinder head bolts 20 (not shown) pass through the longer bores 16 (not shown) in the cylinder head 10 near the interior exhaust gas outlet walls 66 through which exhaust gases pass from the combustion cylinder to the exhaust gas outlets 64.

Figure 15:
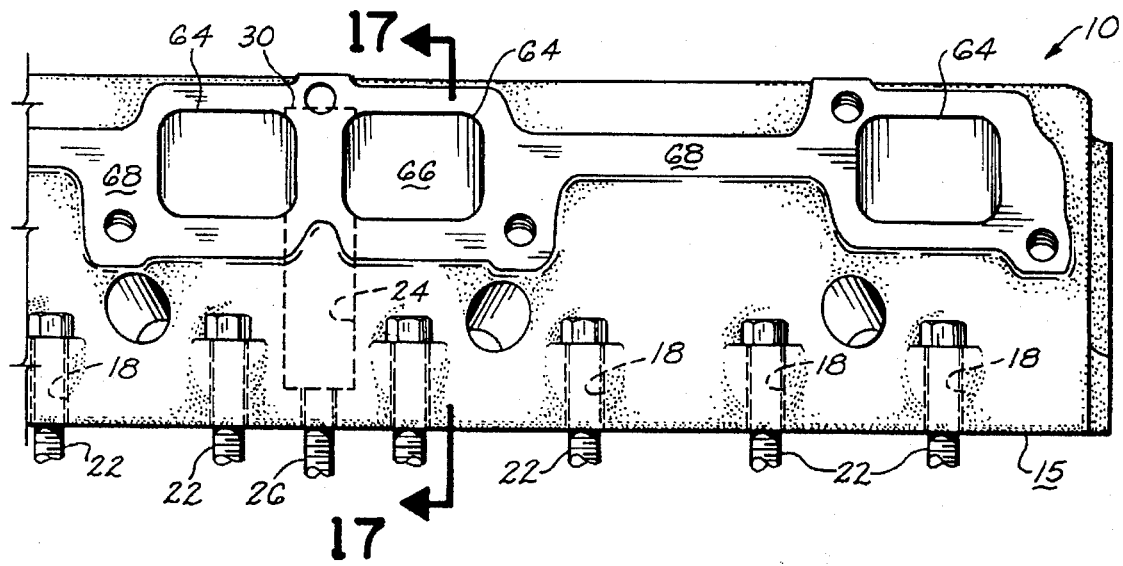
FIG. 15 is a partial view of the exhaust manifold side of the cylinder head depicted in FIG. 3.

Referring now to FIG. 15, the longer bore 16 has been drilled to create the larger bore 24 in which the cylinder head bolt plug 30 is deployed. The cylinder head bolt plug 30 permits reshaping and recontouring of the interior exhaust gas outlet walls 66 to improve flow of exhaust gases and reduce exhaust back pressure.

Figure 16:
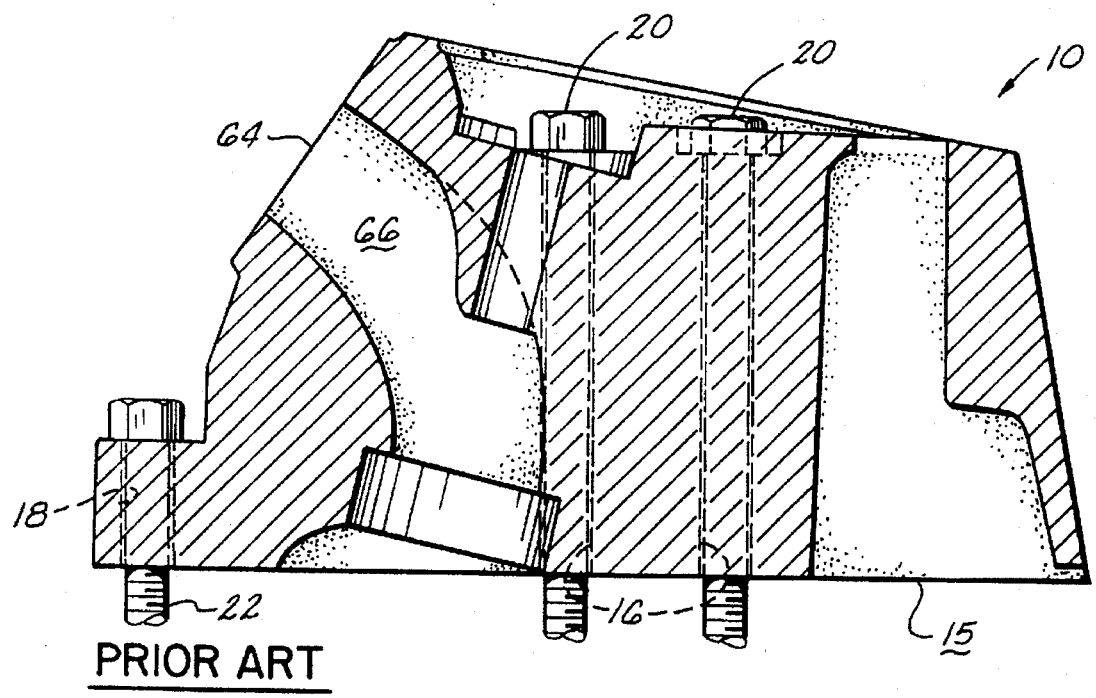
FIG. 16 (prior art) is a cross-sectional view along 16—16 of the cylinder head depicted in FIG. 14.
Figure 17:
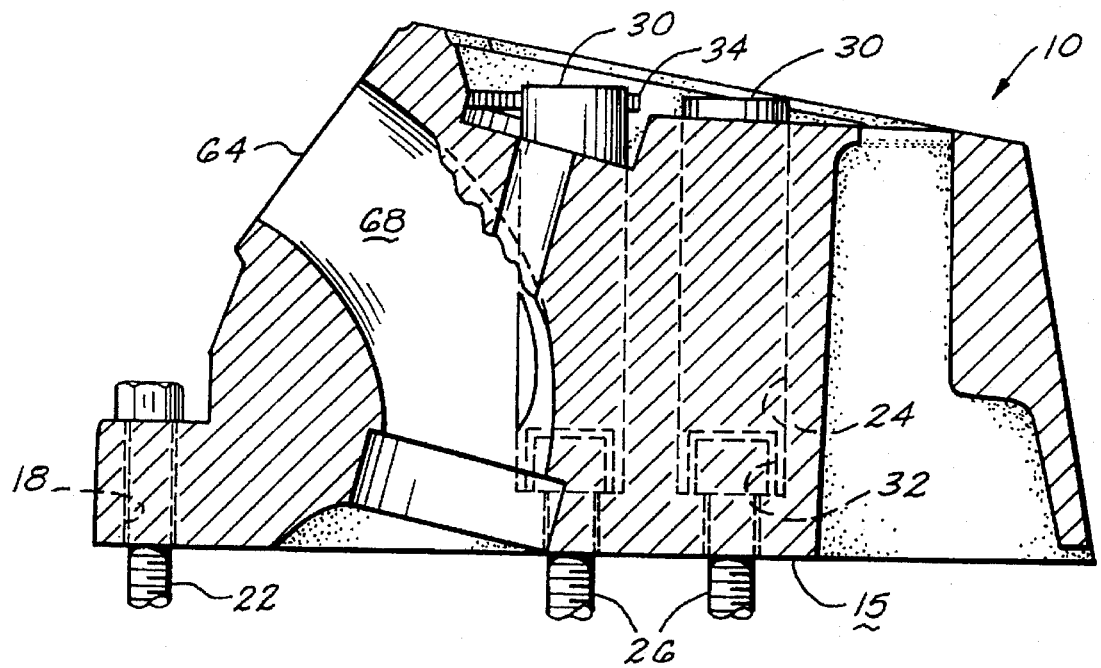
FIG. 17 is a cross-sectional view along 17—17 of the cylinder head depicted in FIG. 15.

Referring now to FIG. 16 (prior art cylinder head 10) and FIG. 17 (the cylinder head 10 modified according to the present invention), the longer bores 16 of the cylinder head 10 (FIG. 16) are drilled to create the larger bores 24 in which the cylinder head bolt plugs 30 are deployed (FIG. 17). Recontoured and reshaped interior exhaust gas outlet walls 66 provide increased flow of exhaust gases and reduced exhaust back pressure.

Figure 18:
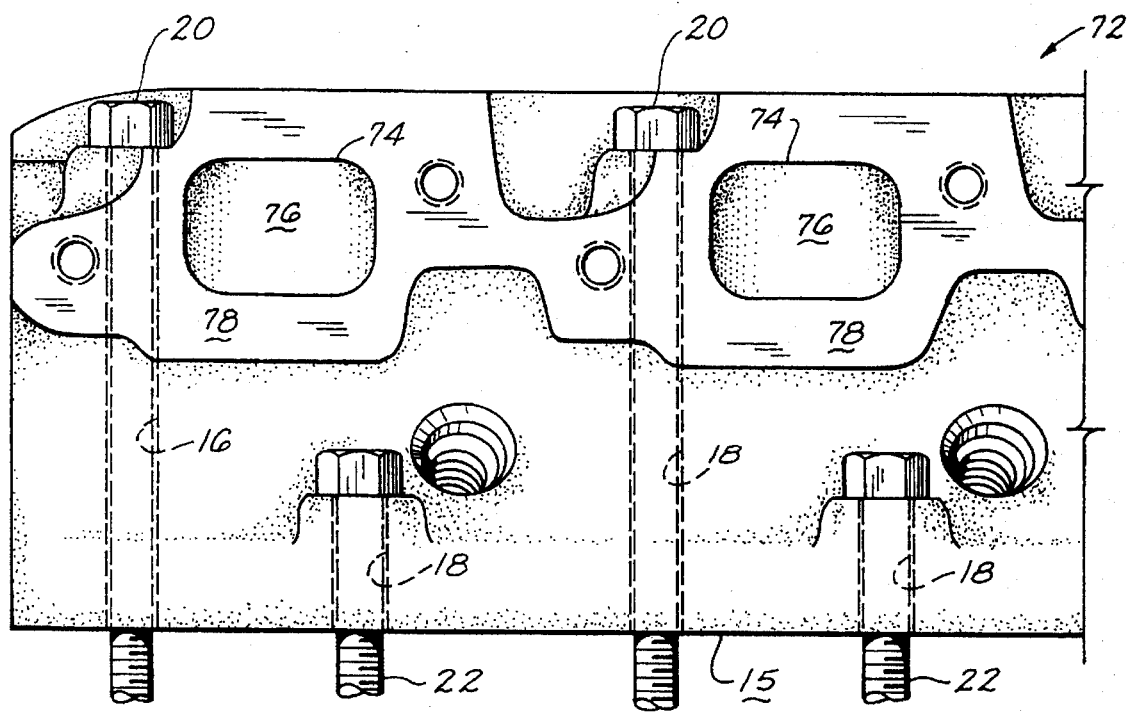
FIG. 18 is a partial view of the exhaust manifold side of a cylinder head for a big block Chevrolet V-8 internal combustion engine.

Referring now to FIG. 18, a prior art cylinder head 72 for a big block Chevrolet V-8 internal combustion engine is shown with exhaust gas outlets 74, interior exhaust gas outlet walls 76, and exhaust manifold sealing face 78. Longer cylinder head bolts 20 and shorter cylinder head bolts 22 are disposed within longer bores 16 and shorter bores 18, respectively. Removal of metal from the interior exhaust gas outlet walls 76 is limited by the close proximity of the longer bores 16.

Figure 19:
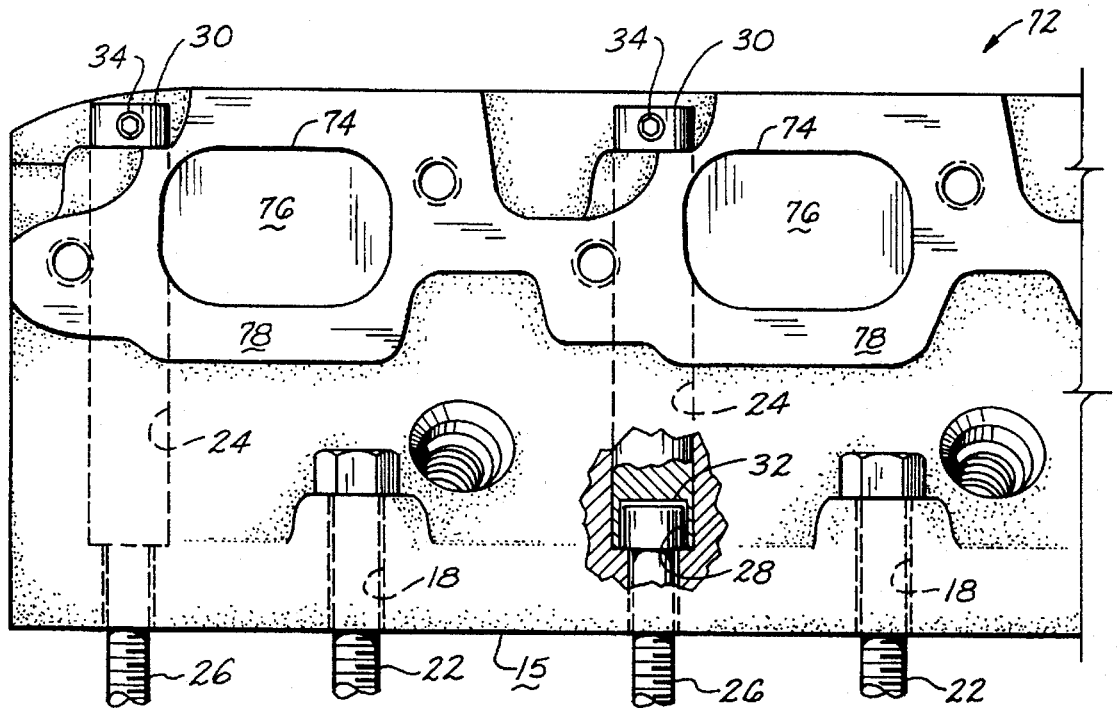
FIG. 19 is a partial view of the cylinder head depicted in FIG. 18 modified according to the present invention.

Referring now to FIG. 19, depicted therein is the cylinder head 70 as modified according to the present invention. The longer bores 16 have been drilled to produce larger bores 24 in which the cylinder head bolt plugs 30 are deployed. An inner-fitting head bolt 26 secures the cylinder head 72 to the engine block (not shown). The interior exhaust gas outlet walls 76 can now be reshaped and recontoured without concern for the longer bores 16 (FIG. 18). Simultaneous removal of metal from the interior exhaust gas outlet walls 76 and the cylinder head bolt plugs 30 permits substantial changes in the flow characteristics of the exhaust gases to reduce exhaust back pressure and improve performance of the internal combustion engine.

While the cylinder head bolt plug has been described in relation to internal combustion engines having poppet valves, it will be understood by one skilled in the art that the cylinder head bolt plug also has application in rotary-valve engines. The cylinder head bolt plug removes limitations on recontouring and reshaping of interior walls of air inlets and interior walls of exhaust gas outlets. In addition, the cylinder head bolt plug reduces flexing and cracking of cylinder heads by replacing the longer cylinder head bolts with shorter inner-fitting cylinder head bolts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for increasing air flow through the air inlet of the cylinder head of an internal combustion engine, wherein the cylinder head includes longer bores and shorter bores through which longer cylinder head bolts and shorter head bolts, respectively, pass to secure the cylinder head to the block of the internal combustion engine, said method comprising:

countersinking a longer bore to create a larger bore to a depth such that the cylinder head can be secured to the block by a shorter inner-fitting cylinder head bolt of substantially the same length as the shorter cylinder head bolts;

replacing the longer cylinder head bolt with said short inner-fitting cylinder head bolts;

inserting a cylindrical plug into said larger bore, said cylindrical plug substantially filling said larger bore;

securing said cylindrical plug to the cylinder head so said cylindrical plug does not move within said larger bore;

recontouring and reshaping the interior air inlet wall near said larger bore by removing metal simultaneously from the interior air inlet wall and from said cylindrical plug inserted into said larger bore;

sealing said cylindrical plug to prevent open communication between adjacent chambers within the cylinder head; and sealing said cylindrical plug to prevent oil from leaking into the air chamber within the cylinder head.

2. A method for increasing flow of exhaust gases through the exhaust gas outlet of the cylinder head of an internal combustion engine, wherein the cylinder head includes longer bore and shorter bores through which longer cylinder head bolts and shorter head bolts, respectively, pass to secure the cylinder head to the block of the internal combustion engine, comprising:

countersinking a longer bore adjacent an interior wall of the exhaust outlet to create a larger bore to a depth such that the cylinder head can be secured to the block by a shorter inner-fitting cylinder head bolt of substantially the same length as the shorter cylinder head bolts;

replacing the longer cylinder head bolt with said short inner-fitting cylinder head bolt;

inserting a cylindrical plug into said larger bore, said cylindrical plug substantially filling said larger bore;

securing said cylindrical plug to the cylinder head so said cylindrical plug does not move within said larger bore;

recontouring and reshaping the interior exhaust outlet wall adjacent said larger bore by removing metal simultaneously from the interior exhaust outlet wall and from said cylindrical plug inserted into said larger bore;

sealing said cylindrical plug to prevent open communication between adjacent chambers within the cylinder head; and sealing said cylindrical plug to prevent oil from leaking into the exhaust gas chamber within the cylinder head.

3. A cylinder head bolt plug for an internal combustion engine, wherein the cylinder head is characterized as having longer bores and shorter bores through which longer and shorter bores longer cylinder head bolts and shorter cylinder head bolts, respectively, pass to secure the cylinder head to the block of the internal combustion engine, wherein a longer bore has been partially drilled out to create a larger-diameter bore which is reduced to the original diameter of the longer bore at one end, said cylinder head bolt plug comprising:

a cylindrical plug having a diameter slightly less than the diameter of the larger-diameter bore, said cylindrical plug characterized as having a length 0.25 to 0.50 inch greater than the length of the larger-diameter portion of the longer bore, said cylindrical plug further characterized as having an upper end and a lower end; and locking means for locking said cylinder head bolt plug in a fixed position in the cylinder head.

4. The cylinder head bolt plug of claim 3, wherein said locking means further comprises a set screw deployed within said upper end of said cylindrical plug, said set screw biasing said cylindrical plug against the cylinder head to prevent said cylindrical plug from moving within the larger bore.

5. The cylinder head bolt plug of claim 3, further comprising a first sealing means attached to said cylindrical plug to prevent communication between adjacent air inlets, said first sealing means further preventing communication between adjacent interior passages within the cylinder head.

6. The cylinder head bolt plug of claim 3, further comprising a second sealing means attached to said cylindrical plug to prevent oil from leaking into internal passages within the cylinder head.

7. The cylinder head bolt plug of claim 5, wherein said first sealing means further comprises two vertical compression seals disposed in substantially diametrically opposite locations along the circumference of said cylindrical plug.

8. The cylinder head bolt plug of claim 7, wherein said vertical compression seals further comprise:

two diametrically opposite vertical grooves in said cylindrical plug; and compressible seals disposed within said vertical grooves.

9. The cylinder head bolt plug of claim 6, wherein said second sealing means further comprises a circular compression seal disposed about said upper portion of said cylindrical plug.

10. The cylinder head bolt plug of claim 9, wherein said circular compression seal comprises an O-ring in a groove.

11. The cylinder head bolt plug of claim 3, wherein said cylindrical plug includes a recess in said lower portion of said cylindrical plug to permit said recess to enclose the head of a short inner-fitting cylinder head bolt.

12. The cylinder head bolt plug of claim 3, wherein said upper portion of said cylindrical plug is provided with a threaded opening along the longitudinal axis of said cylindrical plug to permit insertion of a threaded stud into said threaded opening to facilitate removal of said cylindrical plug from the cylinder head.

13. The cylinder head bolt plug of claim 3, wherein said cylindrical plug is approximately 0.75 inches in diameter.

14. The cylinder head bolt plug of claim 3, wherein said cylindrical plug is constructed from aluminum.

15. The cylinder head bolt plug of claim 9, wherein said compression seals are of a material capable of performing at temperatures between 1,500 degrees Fahrenheit and 2,000 degrees Fahrenheit.

16. The cylinder head bolt plug of claim 10, wherein said circular compression seal is of a material capable of performing at temperatures between 1,500 degrees Fahrenheit and 2,000 degrees Fahrenheit.

17. A cylinder head bolt plug kit for an internal combustion engine, wherein the cylinder head of the internal combustion engine is characterized as having longer bores and shorter bores through which longer and shorter bores longer cylinder head bolts and shorter cylinder head bolts, respectively, pass to secure the cylinder head to the block of the internal combustion engine, wherein a longer bore has been partially drilled out to create a larger-diameter bore which is reduced to the original diameter of the longer bore at one end, said cylinder head bolt plug kit comprising:

a cylindrical plug having a diameter slightly less than the diameter of the larger-diameter bore, said cylindrical plug characterized as having a length 0.25 to 0.50 inch greater than the length of the larger-diameter portion of the longer bore, said cylindrical plug further characterized as having an upper end and a lower end;

locking means for locking said cylinder head bolt plug in a fixed position in the cylinder head; and a short inner-fitting cylinder head bolt to be used in place of the standard longer cylinder head bolt.

18. The cylinder head bolt plug kit of claim 17, wherein said locking means further comprises a set screw deployed within said upper end of said cylindrical plug, said set screw biasing said cylindrical plug against the cylinder head to prevent said cylindrical plug from moving within the larger bore.

19. The cylinder head bolt plug kit of claim 17, further comprising a first sealing means attached to said cylindrical plug to prevent communication between adjacent air inlets, said first sealing means further preventing communication between adjacent interior passages within the cylinder head.

20. The cylinder head bolt plug kit of claim 17, further comprising a second sealing means attached to said cylindrical plug to prevent oil from leaking into internal passages within the cylinder head.

21. The cylinder head bolt plug kit of claim 19, wherein said first sealing means further comprises two vertical compression seals disposed in substantially diametrically opposite locations along the circumference of said cylindrical plug.

22. The cylinder head bolt plug kit of claim 21, wherein said vertical compression seals further comprise:

two diametrically opposite vertical grooves in said cylindrical plug; and compressible seals disposed within said vertical grooves.

23. The cylinder head bolt plug kit of claim 20, wherein said second sealing means further comprises a circular compression seal disposed about said upper portion of said cylindrical plug.

24. The cylinder head bolt plug kit of claim 23, wherein said circular compression seal comprises an O-ring in a groove.

25. The cylinder head bolt plug kit of claim 17, wherein said cylindrical plug includes a recess in said lower portion of said cylindrical plug to permit said recess to enclose the head of said short inner-fitting cylinder head bolt.

26. The cylinder head bolt plug kit of claim 17, wherein said upper portion of said cylindrical plug is provided with a threaded opening along the longitudinal axis of said cylindrical plug to permit insertion of a threaded stud into said threaded opening to facilitate removal of said cylindrical plug from the cylinder head.

27. The cylinder head bolt plug kit of claim 17, wherein said cylindrical plug is approximately 0.75 inches in diameter.

28. The cylinder head bolt plug kit of claim 17, wherein said cylindrical plug is constructed from aluminum.

29. The cylinder head bolt plug kit of claim 23, wherein said compression seals are of a material capable of performing at temperatures between 1,500 degrees Fahrenheit and 2,000 degrees Fahrenheit.

30. The cylinder head bolt plug kit of claim 24, wherein said circular compression seal is of a material capable of performing at temperatures between 1,500 degrees Fahrenheit and 2,000 degrees Fahrenheit.

* * * * *